July 17, 1956 R. H. BLACKFORD 2,754,844
VALVE
Filed July 8, 1952 2 Sheets-Sheet 1
FIG_1_
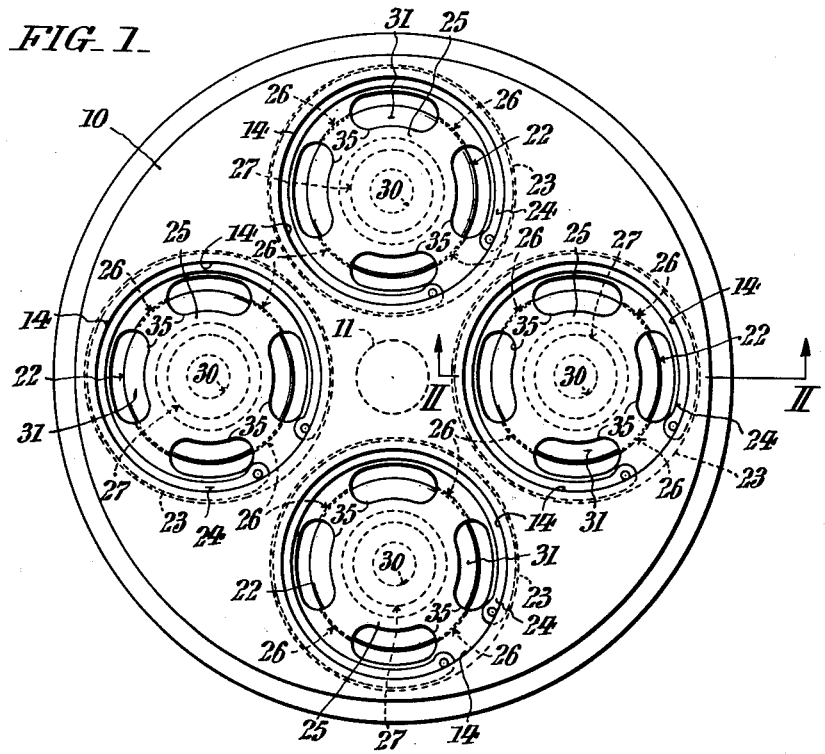
FIG_2_
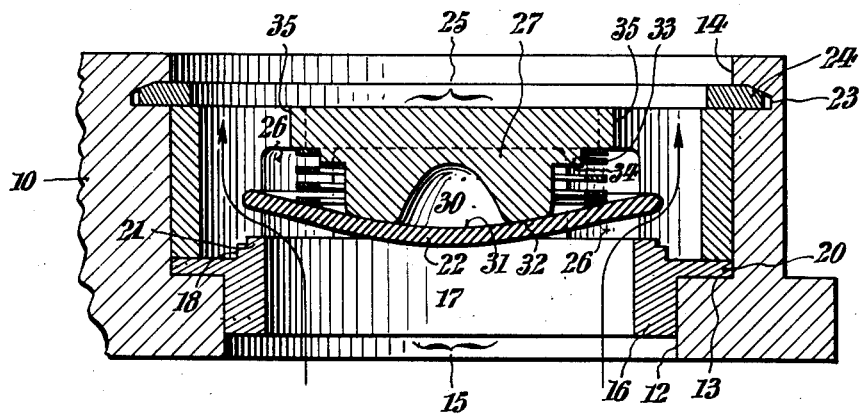
INVENTOR:
Raymond H. Blackford,
BY Paul & Paul
ATTORNEYS.

July 17, 1956  R. H. BLACKFORD  2,754,844
VALVE
Filed July 8, 1952  2 Sheets-Sheet 2
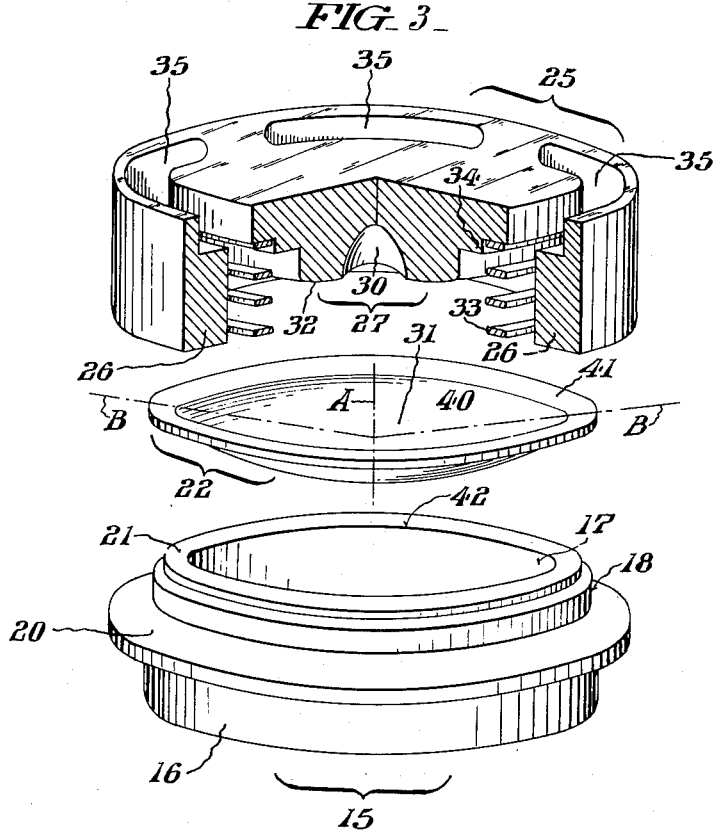
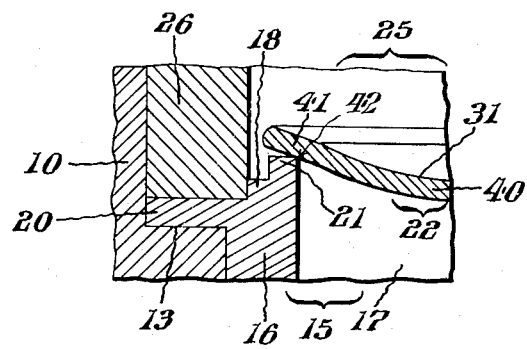
INVENTOR.
Raymond H. Blackford,
BY Paul & Paul
ATTORNEYS.

United States Patent Office 2,754,844
Patented July 17, 1956

2,754,844
VALVE

Raymond H. Blackford, Flushing, N. Y., assignor to Durabla Manufacturing Company, New York, N. Y., a corporation of New York Application July 8, 1952, Serial No. 297,729

6 Claims. (Cl. 137—514)

This invention relates to a valve, and more particularly to a valve for use with a compressible fluid, such valves being adaptable as intake and exhaust valves for compressors, for example.

It is an object of this invention to provide, in a valve of this character, a reciprocating valve member which has great strength and endurance and resistance to warping after long use. Another object is to provide a valve for a compressible fluid which has a positive seating action and forms a tight seal each time it is seated.

Still another object of the invention is to provide a valve for use in a compressor which enables an improved compressor efficiency to be attained.

Yet another object of this invention is to provide an efficient stop for a valve of this character and to provide effective means for minimizing shock as the valve reciprocates between the stop and its seat.

Another object is to provide a valve which has a much less complex shape than conventional valves and is extremely light weight but has capacity to withstand high stresses with minimum deformation.

Still another object of this invention is to provide a valve for use with a compressible fluid such as air or the like wherein means are provided in the valve for guiding the fluid and minimizing turbulence as the fluid flows through the valve. Another object is to provide a compressor valve which does not overheat in service.

The foregoing and other objects of this invention, including the simplicity and economy of the same, and the ease with which a valve of this character may be manufactured, will further become apparent hereinafter and in the drawings whereof:

Fig. 1 represents a plan view of a compressor valve deck containing four intake valves each embodying features of this invention;

Fig. 2 represents an enlarged sectional view in side elevation, taken substantially as indicated by the lines and arrows II—II in Fig. 1, the valve being shown in open position;

Fig. 3 represents an enlarged exploded view, with certain parts broken away and shown in section in order to reveal important details, of the valve mechanism shown in Figs. 1 and 2; and Fig. 4 represents a fragmentary enlarged view showing the arrangement of valve and seat when the valve is closed.

Turning now to the specific form of the invention selected for illustration in the drawings, the number 10 designates a housing or deck which has a central threaded shaft 11 which serves to connect the housing 10 to the cylinder of a compressor or the like, not shown. The housing 10 carries four valve members which are mounted in four passages that extend through the housing. Each passage has a bore 12 which serves as an inlet opening in the housing and a relatively wide bore 14 which connects with bore 12 forming a shoulder 13. The bore 14 serves as an outlet opening for the compressible fluid.

Fitted to the shoulder 13 is a valve seat member 15 having a sleeve 16 with a central passage 17 for the compressed fluid. The valve seat member 15 also has a flange 20 which fits on shoulder 13. The valve seat member 15 also has a shoulder 18 and a recessed annular wall 21 the inner edge of which comprises a seat for a valve disc 22, as will further appear hereinafter. Valve disc 22 is a rigid dished plate and preferably has a substantially parabolic cross section. This is advantageous and important, as will further appear hereinafter.

Expanded into a groove 23 in the housing 10 is a split retainer ring 24 securing a valve guide member 25 in the bore 14. Valve guide member 25 has ribs 26 which serve to guide the valve disc 22 as it reciprocates toward and away from the valve seat member 15. Ribs 26 also fit against the shoulder 18 and serve to space the seat member 15 and the guide member 25, and to maintain them in fixed position with respect to each other. The valve guide member 25 also includes a stop member 27 which has a cavity 30 that is wholly enclosed with the exception of an opening which faces the concave or upper face 31 of valve disc 22. The lower face 32 of stop member 27 is convex and preferably has the same shape and curvature as the disc face 31. Elongated openings 35 are formed in the valve guide member 25. They serve as outlets for the compressed fluid.

The number 33 designates a helical spring which surrounds a shoulder 34 formed on stop member 27. The spring 33 is continuously under compression and bears against the concave face 31 and continuously urges valve disc 22 toward seat 15.

Turning now to Figs. 3 and 4, it will be observed that the rigid valve disc 22 has a substantially parabolic body portion 40 and a substantially flat edge portion 41 which extends around the periphery of the body portion 40. The body portion 40 has a central axis A, and the edge portion 41 is inclined at a uniform angle to the central axis A, as indicated by the dash lines B, B in Fig. 3 each of which lies in the plane of the upper face of edge portion 41. The valve seat annular wall 21 has an inner edge 42, see particularly Fig. 4, which engages the flat inclined edge portion 41 with substantially line contact, the edge portion being tangential to the seat. Preferably the seat edge 42 is circular and the seal formed between the seat and valve extends along a circular line of contact around the flat edge portion 41, about midway between its inner and outer edges, as indicated in Fig. 4.

It is important to observe that the body portion of valve disc 22 has a substantially parabolic cross section, as distinguished from a circular or other curved cross section. Valve disc 22 has much better properties than other curved valve discs.

The valve disc 22 is preferably made by mounting a flat plate of suitatble metal on top of a seat generally similar to the top of wall 21 on valve seat member 15 shown in Fig. 2, and forcing hydraulic fluid against face 31 of the flat plate. As the hydraulic fluid pressure is gradually increased uniform pressure is exerted across the entire plate area and the metal plate is gradually deformed until it has a substantially parabolic cross section. In this condtion the valve is pre-stressed and has capacity to withstand high stresses and minimum deformation, which is an important feature of this invention. After the hydraulic pressure is relieved the flat edge portion 41 may if desired be formed in any convenient manner provided the substantially parabolic shape of the body portion 40 is retained.

The tangential seating arrangement of valve edge 41 and valve seat edge 42 provides a line-contact seat having a minimum seating area. It minimizes the effect of back pressure in opposition to the lifting of the valve and this results in improved compressor efficiency.

The dished valve with a substantially flat, uniformly inclined edge portion also coacts with the inner edge of the valve seat to stabilize the valve disc 22 when seated, and to prevent any substantial rocking of the valve disc as an incident to its operation. With this construction the valve is required to seat in nearly the same position each time it closes, while allowing just enough deviation to permit the valve wear to be properly spread.

It will be appreciated that in operation the valve 22 reciprocates, often at quite high speeds, between the seat and the stop. The dash-pot action of cavity 30, wherein compressed fluid is trapped to cushion the impact of valve 22 upon the stop member 27, prolongs the life of the valve parts. Moreover, due to the corresponding shapes of valve stop and valve, the impact of the valve on the stop is absorbed over a wide area.

The valve 22 is strong and resists breaking and warping in compressor type service. Weak points are not created in the manufacturing process, as is the case with many conventional valve discs. The valve disc is preferably made of pressed metal and its shape is much less complex than many ordinary valve discs.

Many conventional valves have a tendency to wear due to uneven forces, but with the valve structure of this invention the forces on the valve disc tend to be much less uneven. Moreover the extreme light weight of the valve minimizes wear.

With the substantially parabolic valve disc arranged with its convex face adjacent the valve seat, substantially cup-shaped fluid flow is obtained with minimum turbulence. In some conventional valves there is considerable turbulence which produces heat. Heating is also caused, in conventional valves, by leakage of compressible fluid between the valve disc and seat. In accordance with this invention the line contact between the valve disc 22 and its seat forms a tight seal and assists in minimizing any tendency to overheat.

While in certain of the claims the cross sectional shape of the valve is referred to as "substantially parabolic," it is not intended to limit this invention to the precise geometry of a parabola, since it is intended to comprehend with this term valve structures wherein the shape of the valve disc is similar to that achieved by deforming a flat metal sheet or plate with fluid pressure substantially as described.

Although this invention has been described with reference to one specific example adapted particularly for compressor-type service, it will be apparent that the valve is capable of a wide variety of applications and uses, and that certain features thereof can be used to advantage without the use of other features, all without departing from the scope of the appended claims. It is to be understood that the specific features referred to and claimed herein are intended to comprehend all mechanical equivalents and reversals of parts which function in a similar manner to accomplish the same result.

Having thus described my invention, I claim:

1. In a valve for a compressible fluid, the combination comprising a body member having a passage through which the fluid may pass, a valve seat carried by said body member, and a valve in the form of a rigid dished plate whose central portion has a parabolic longitudinal cross section, said dished plate being reciprocable toward and away from said seat, said dished plate having a circular transverse cross section at any point taken along the longitudinal axis thereof.

2. In a valve for a compressible fluid the combination comprising a housing, a ported valve seat member carried by said housing, said seat member having an inner edge extending around the periphery of said port, a valve disc in the form of a rigid dished plate whose central portion has a parabolic longitudinal cross section, said dished plate being reciprocable toward and away from said seat, said dished plate having a circular transverse cross section at any point taken along the longitudinal axis thereof, said plate having around its outer edge an edge portion inclined with respect to the inner edge of the seat to engage said inner edge with substantially line contact when the valve is closed, and reactive means carried by said housing continuously urging said valve disc toward said seat.

3. The valve defined in claim 2, wherein said outer edge portion of said valve disc is substantially flat.

4. The valve defined in claim 3, wherein said outer flat edge portion is inclined at a uniform angle to said axis.

5. In a valve for a compressible fluid the combination comprising a body member having a passage for the compressible fluid, a valve seat carried by said body member, a stop member carried by the body member, said stop member being spaced away from said valve seat, and a valve in the form of a rigid dished plate whose central portion has a parabolic longitudinal cross section, said dished plate being reciprocable between said stop member and said valve seat to open and close said passage, said dished plate having a circular transverse cross section at any point taken along the longitudinal axis thereof, said stop member having a cavity facing the adjacent face of the dished plate serving to trap the compressible fluid and thereby cushion the impact of the plate against said stop member.

6. The valve defined in claim 5, wherein the rigid dished plate has a concave face disposed opposite said cavity, and wherein said stop member has a convex face of matched curvature.

References Cited in the file of this patent

UNITED STATES PATENTS

| | | |
|---|---|---|
| 797,739 | Meer | Aug. 22, 1905 |
| 850,167 | Lee | Apr. 16, 1907 |
| 939,987 | Dawley | Nov. 16, 1909 |
| 1,599,716 | Replogle | Sept. 14, 1926 |
| 1,715,782 | Pickop | June 4, 1929 |
| 1,852,582 | Longacre | Apr. 5, 1932 |
| 1,974,533 | Evans | Sept. 25, 1934 |
| 2,016,390 | Richardson | Oct. 8, 1935 |
| 2,021,351 | Carson | Nov. 19, 1935 |
| 2,025,296 | McIntyre | Dec. 24, 1935 |
| 2,603,231 | Birkemeier | July 15, 1952 |
| 2,603,452 | Spinney | July 15, 1952 |
| 2,608,214 | Renick | Aug. 26, 1952 |
| 2,657,708 | Kamm | Nov. 3, 1953 |

FOREIGN PATENTS

| | | |
|---|---|---|
| 112,332 | Sweden | 1944 |